United States Patent [19]
Herd
[11] 4,375,066
[45] Feb. 22, 1983

[54] IJP DROP MODULATOR

[75] Inventor: Richard D. Herd, Duncanville, Tex.
[73] Assignee: Recognition Equipment Incorporated, Dallas, Tex.

[21] Appl. No.: 242,213
[22] Filed: Mar. 10, 1981
[51] Int. Cl.[3] .............................................. G01D 15/18
[52] U.S. Cl. .................................... 346/140 R; 346/75
[58] Field of Search ........ 346/140 IJ, 140 R, 140 PD, 346/75

[56] References Cited

U.S. PATENT DOCUMENTS 3,950,760 4/1976 Rauch ................................ 346/140
4,005,435 1/1977 Lundquist et al. ...................... 346/1
4,007,464 2/1977 Bassous et al. ............ 346/140 IJ X
4,023,183 5/1977 Takona et al. ........................ 346/75
4,045,801 8/1977 Iwasaki .............................. 346/140
4,245,225 1/1981 Fillmore et al. ........... 346/140 IJ X
4,314,263 2/1982 Carley ............................ 346/140 R

OTHER PUBLICATIONS

IBM Technical Disclosure Bulletin, vol. 15, No. 3, Aug., 1972, *Replaceable Ink Jet Nozzle,* Kotasek, p. 910.
RCA Technical Notes, No. 1248, Jun. 1980, *An Anti--Leak Device for Ink Jet Markers,* Murray.

*Primary Examiner*—A. D. Pellinen
*Assistant Examiner*—W. J. Brady
*Attorney, Agent, or Firm*—John E. Vandigriff

[57] ABSTRACT

An adjustable frequency Ink Jet Gun utilizing a variable ink chamber and replaceable orifice may be used in a wide variety of applications.

6 Claims, 3 Drawing Figures

IJP DROP MODULATOR

FIELD OF THE INVENTION

This invention relates to ink jet printers and more particularly an adjustable frequency ink jet gun for an ink jet printer.

PRIOR ART

Ink jet modulators generally are for a fixed frequency for a specific application or at the most operated over a narrow band of frequencies. Commonly these modulators will be a piece of piezo electric crystal which vibrate the ink prior to ejection from the modulator at the frequency of the crystals. The orifice through the ink is ejected may not be a intergral part of the modulator. The orifice may be in a metal front plate or may consist of glass or a jewel structure. The nozzle is one of the most critical components of the modulator as it is the size of the orifice which dictates the size of the drop and influences the point at which the drops break away from the ink stream. Because of the critical dimentional considerations most nozzles are designed for a specific use or application. If these applications or uses are changed, then a new nozzle must be designed.

Most prior art in ink jet printers have been electromagnetically tuned to the particular drop rate. Any deviation in operation from the tuned frequency has been accomplished by a deterioration in the modulator efficiency caused by changes which occur in the distance between the nozzle and the droplet break-off point. Variation in distance of the break-off from the nozzle affects the drop charging function. Therefore, directly affecting the printing characteristics.

Typical prior art modulation systems are those disclosed in U.S. Pat. Nos. 3,927,410; 3,871,004; 3,848,118; 3,787,884; and 3,747,120.

SUMMARY OF THE INVENTION

The invention is an ink jet modulator with reliable operation characteristics over a wide band of drop frequencies. The occurrence of satellite droplets are substantially eliminated. Changes in temperature, ink pressure and drop rates are not as critical and can be accomodated without degrading the print quality. Singular or plural orifices may be used without sacrificing either the simple construction or the efficient operation of the modulator.

THE DRAWINGS

Table I is a list of operating frequency, orifice, and cavity sizes.

DESCRIPTION OF THE PREFERRED EMBODIMENT

Figure 1:
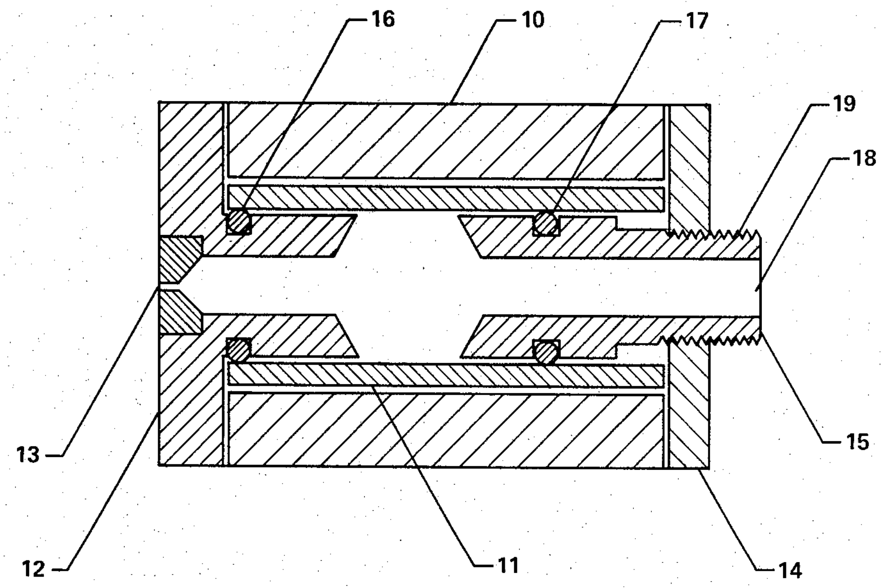
FIG. 1 is a cross sectional view of an ink modulator according to the present invention.

Referring to FIG. 1 there is shown a cross sectional view of the adjustable frequency ink jet modulator of the present invention. The modulator structure consists of a tubular or cylindrical housing 10. Inside the housing is a cylindrical crystal 11 which is a piezoelectric crystal. A front plate 12 having the orifice 13 therein encloses the front of the crystal. The inside of the crystal and the front plate are sealed with o-ring 16. Ink enters the modulator through opening 18 in the plunger 15. Plunger 15 seals against the inside of the crystal 11 with o-ring 17. Plunger 15 is moved into and out of the crystal with threads 19. Since the plunger may be moved in or out the frequency of operation may be varied. This results from the varying of the ink cavity within the crystal. The crystal housing 10 may be made out of most any nonconductive material such as ceramic or plastic. The ink entering at 18 may be filtered ink and supplied from any standard supply such as an ink reservoir (not shown).

Figure 2:
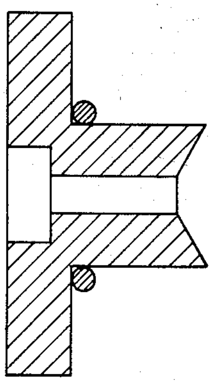
FIG. 2 illustrates the front plate of the modulator when a jeweled nozzle is used.

To accomodate various nozzles the front plate is interchangeable. In FIG. 1 the nozzle may be, for example, glass. A nozzle utilizing a jewel can also be used such a design is illustrated in FIG. 2.

Figure 3:
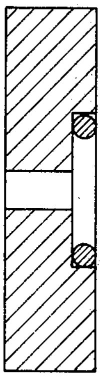
FIG. 3 represents a front plate to be used with a modulator when a drilled orifice is to be used.

In FIG. 3 a drilled orifice is used in the third configuration of the front plate.

Operation of the modulator can be anywhere from 60 to 180 KHZ, utilizing various orifice sizes and cavity sizes. Table 1 lists frequency range vs orifice size and cavity size.

Since the design permits the use of various orifices, and/or nozzle designs, a variety of fluids may be used according to the application to which the modulator is to be placed.

Only single orifice nozzles have been shown; however multiorifice nozzles may be used to produce several streams of droplets.

It is therefore apparent that the novel utilization interchangeable front plates and adjustable cavity size results in a device having a variable operating frequency range which is capable of using various fluids and results in an ink modulator which is less sensitive to a change in nozzle design and operating perameters.

Although a specific example has been shown in the drawings, various changes and modifications may be made without departing from the true scope of the invention as defined by the claims.

TABLE I

| Frequency KHZ | Orifice Size MILS | Cavity Size Dia. (Inches) | Cavity Size Length (Inches) |
|---|---|---|---|
| 60–110 | 1.5–3.0 | 0.1–0.5 | 0.2–0.5 |
| 40–110 | 1.0–2.5 | 0.01–0.3 | 0.1–0.5 |
| 80–180 | 1.0–3.0 | 0.02–0.5 | 0.1–0.5 |

What is claimed:

1. An adjustable frequency ink jet printer modulator comprising; a piezoelectric crystal, a front plate and a rear plate, said crystal, front plate and rear plate forming an ink cavity, and an adjustable plunger extending through said rear plate for varying the size of said ink cavity.

2. The ink modulator according to claim 1 wherein said plunger is generally tubular in shape has an opening extending therethrough through which ink is supplied to said ink cavity.

3. The ink modulator according to claim 1 wherein said front plate has provision for an ink nozzle therein and said front plate is removably mounted to facilitate changing nozzles.

4. The ink modulator according to claim 1 wherein said front plate and plunger have o-rings thereon to form a seal with said crystal.

5. The ink modulator according to claim 1 wherein said crystal resides in a housing and said front and back plates enclose the crystal within said housing.

6. An ink jet modulator comprising; enclosing means including a piezoelectric crystal providing an ink cavity, replaceable nozzle means forming a part of said enclosing means, and a threaded adjustable means at one end of said cavity providing means for changing the size and frequency response of said ink cavity.

* * * * *